No. 696,907. Patented Apr. 1, 1902.
J. LEIGHTHAM.
ADVERTISING WAGON.
(Application filed June 25, 1901.)
(No Model.) 3 Sheets—Sheet 2.

Witnesses
Joseph Leightham Inventor
Attorney

No. 696,907. Patented Apr. 1, 1902.
J. LEIGHTHAM.
ADVERTISING WAGON.
(Application filed June 25, 1901.)
(No Model.) 3 Sheets—Sheet 3.
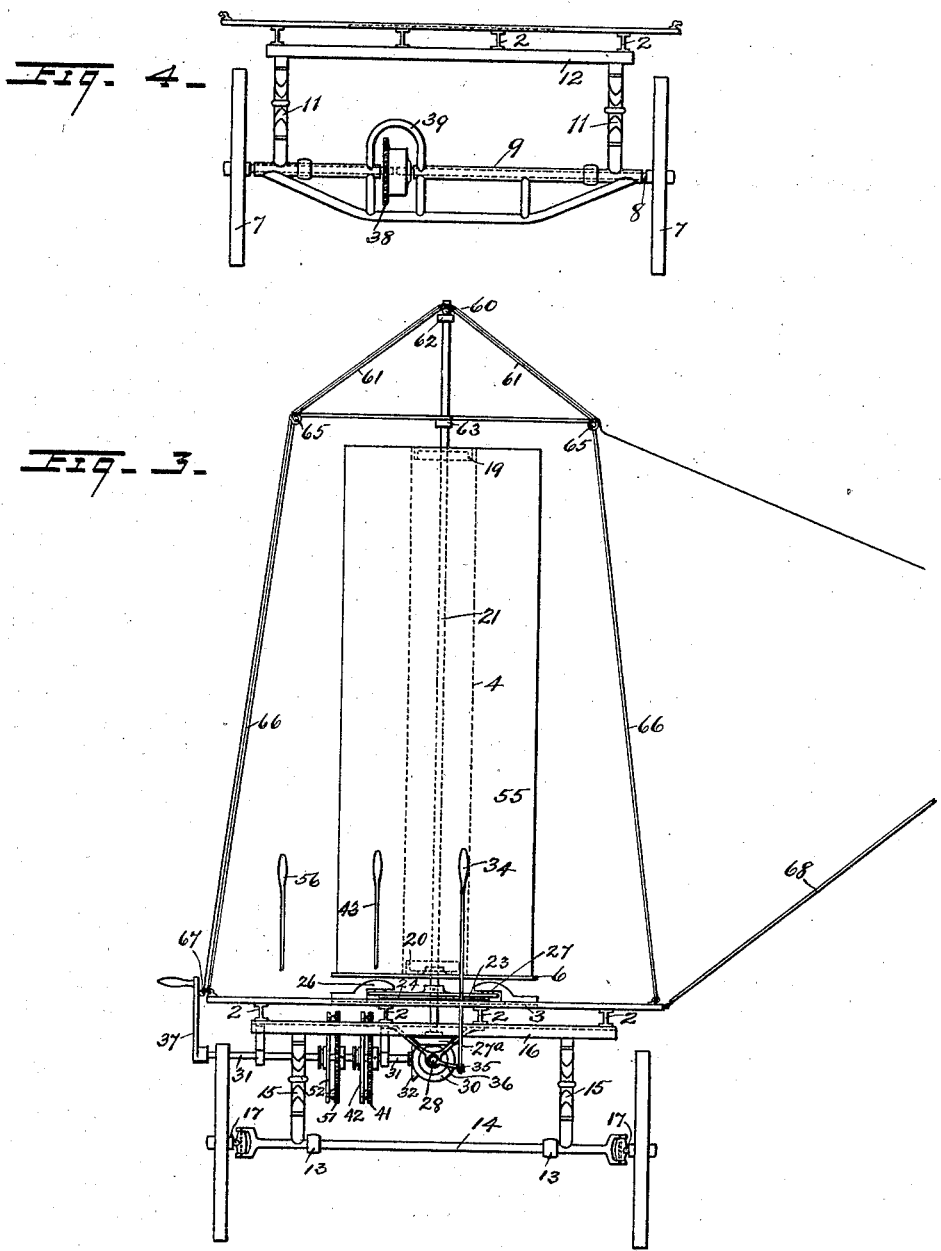

UNITED STATES PATENT OFFICE.

JOSEPH LEIGHTHAM, OF READING, PENNSYLVANIA, ASSIGNOR OF THREE-EIGHTHS TO CHARLES W. KELLER, BENJAMIN F. PFLUM, WILLIAM K. KAUFFMAN, AND JOHN B. MERSINGER, OF READING, PENNSYLVANIA.

ADVERTISING-WAGON.

SPECIFICATION forming part of Letters Patent No. 696,907, dated April 1, 1902.

Application filed June 25, 1901. Serial No. 66,019. (No model.)

*To all whom it may concern:*

Be it known that I, JOSEPH LEIGHTHAM, a citizen of the United States of America, and a resident of Reading, in the county of Berks and State of Pennsylvania, have invented certain new and useful Improvements in Advertising-Wagons, of which the following is a specification.

My invention relates to advertising-wagons, and has for its main object the providing of an improved vehicle of this class in which the panoramic advertising-roll is mounted upon two rotary vertical columns, on one or other of which alternately the exposed intermediate portion of the advertising-sheet is rolled up or unrolled, this rolling or unrolling being effected either automatically by the movement of the vehicle or by means of a suitable motor mounted on the vehicle or by hand, as may be most convenient under different circumstances.

The invention is fully described in connection with the accompanying drawings, and the novel features are pointed out in the subjoined claims.

Figure 1:
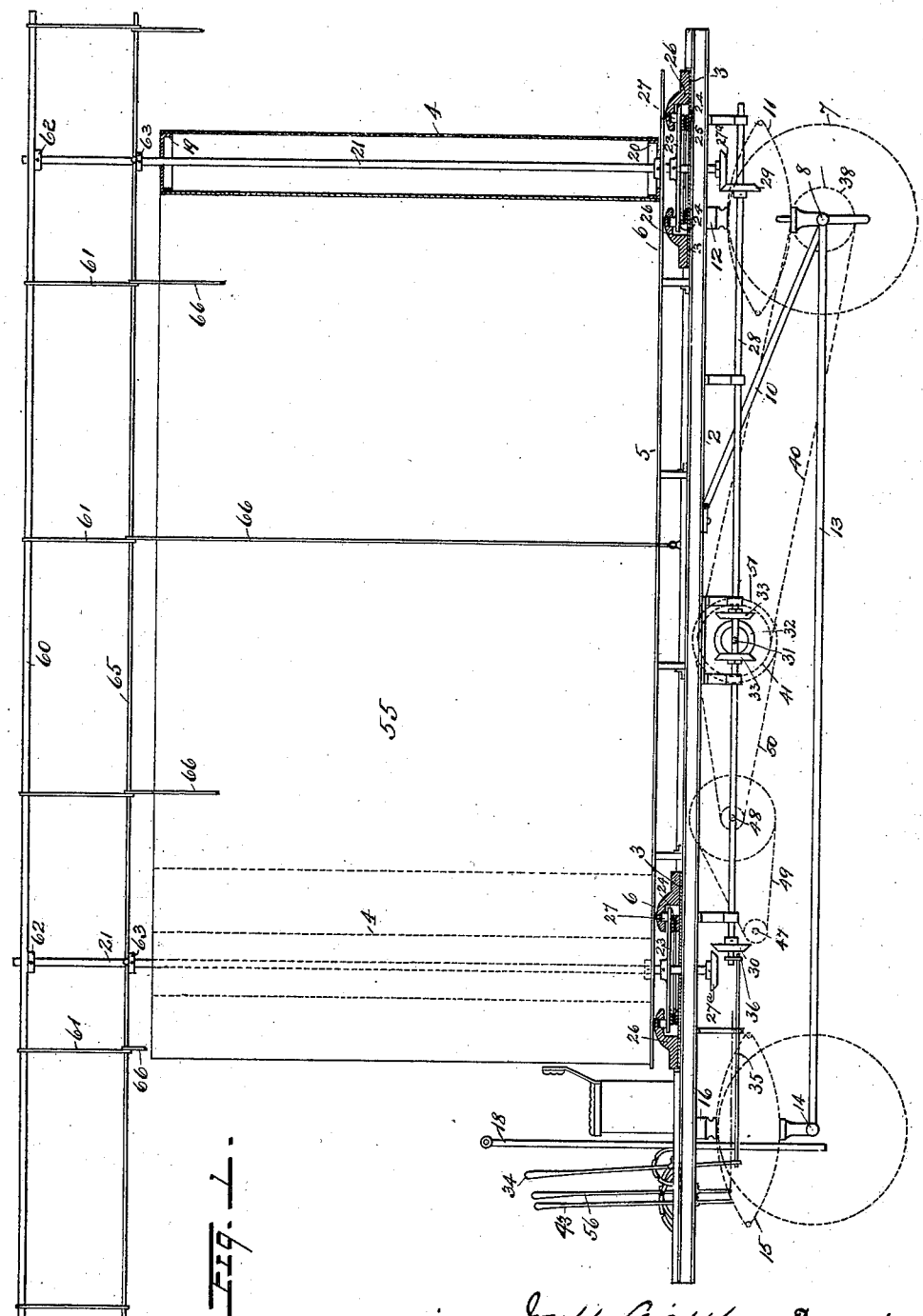
Figure 2:
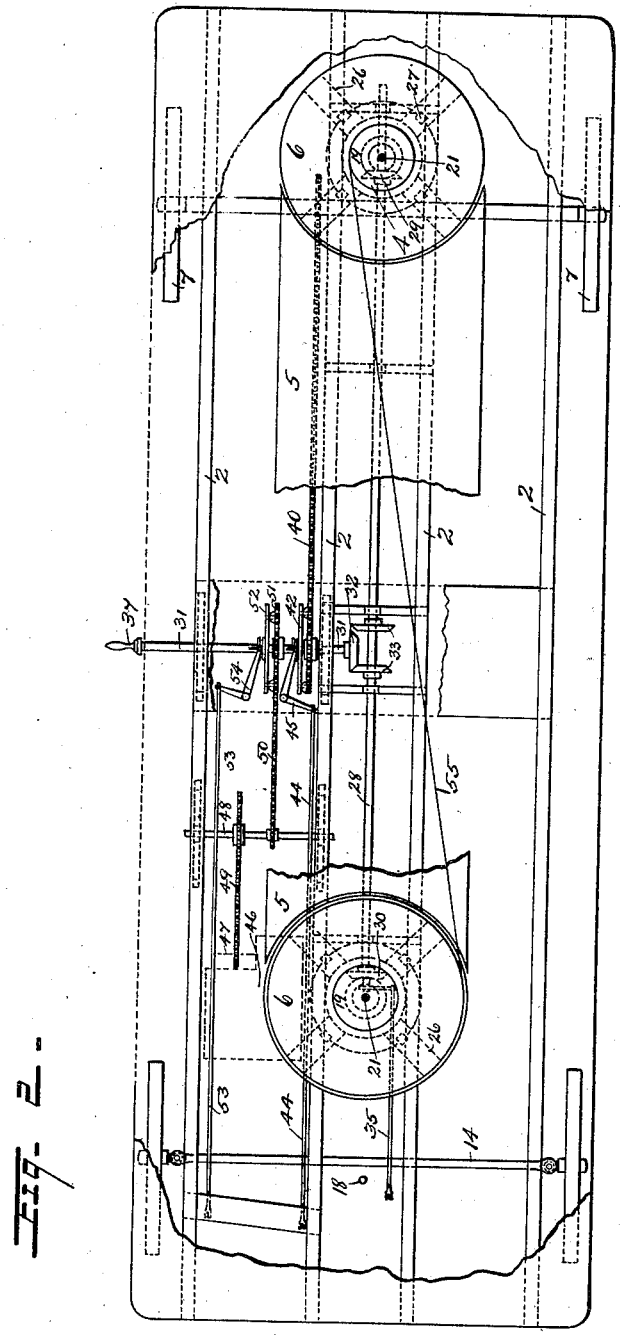

Figure 1 is a side elevation of a vehicle embodying my improvements. Fig. 2 is a plan view of the same. Fig. 3 is a front end elevation showing the awning in position with one side projected laterally at the bottom by the pivoted brace. Fig. 4 is a partial rear end view showing the rear axle.

The bed of the vehicle, as shown, is formed by longitudinal beams 2 and 2, preferably of I-section, to which are secured transverse plates 3 and 3, upon which the front and rear rotary columns 4 and 4, respectively, are mounted, as hereinafter described, and a fixed elevated platform 5 between the base-plates 6 and 6 of said rotary columns. The running-gear upon which the bed of the vehicle is carried comprises the rear wheels 7, which are fixed to a rotary rear axle 8, which is mounted, as shown in Fig. 4, in a transverse bearing-sleeve 9, carried from the beams 2 and 2 by braces 10 and rear springs 11, the latter being clipped to the sleeve and secured to a rear cross-beam 12 under said beams. Longitudinal bars 13 on either side connect this rear-axle sleeve with a front axle 14, the main portion of which is fixed to front springs 15 and 15, similarly secured to another cross-beam 16 under the front ends of the longitudinal beams 2 and 2. This front axle is provided with pivoted ends 17 and 17, upon which the front wheels are mounted, so as to be capable of a swinging movement on the fixed portion 14 of the axle, as is commonly done in automobile construction to provide for the steering of the vehicle. The steering-lever 18 indicated at the front end of the vehicle may be operatively connected with the pivoted ends 17 and 17 of the axle by any ordinary mechanism, which is not shown, as it forms no part of my invention and is well known in vehicle construction.

The rotary columns 4 and 4 are preferably formed of wrought-iron pipes, each provided with top and bottom heads 19 and 20, secured to a central shaft 21 in each column, the upper end of which latter projects above the column and the lower end of which extends below it, as shown, passing through a circular base-plate 6, secured to the bottom head of the column and serving to support and guide the panoramic roll of canvas or other material which is rolled from one to the other of the two columns, as hereinafter described.

The depending end of each shaft 21 has secured to it a short distance below the base-plate 6 of the column a bearing-plate or disk 23, which is provided on its lower surface with a circularly-grooved bearing-ring 24, forming, in connection with a similarly-grooved bottom bearing-plate 3 on the longitudinal beams 2 and 2, a raceway for a series of balls arranged to form an antifriction step-bearing for the column. On this transverse-plate 3 are also fixed a circular series of bearing-arms 26, arranged around the upper bearing-plate 23, so as to overhang the edge of the latter, and each provided with an antifriction-roller 27, against which the upper surface of the bearing-plate 23 contacts when the column is slightly deflected from its normal vertical position. By means of this arrangement of bearings for the columns I am enabled to maintain them in practically vertical position and to rotate them, as required, with a minimum of friction and operating-power. The mechanism shown for rotating these roll-columns provides, as already stated, first, for operation automatically from the rear axle while the vehicle is in movement; second, for operation by a suitable motor mounted on the vehicle, and, third, by the operator. This mechanism comprises, as shown, a bevel-gear 27ª, fixed to the lower end of each vertical shaft 21, a longitudinal shaft 28, mounted in bearings under the bed of the vehicle and provided at its opposite ends with bevel-gears 29 and 30, either one of which is adapted to be thrown into engagement or out of engagement with the adjacent bevel-gear 27ª by a longitudinal movement of the shaft 28, and a transverse operating-shaft 31 to one side of the longitudinal shaft 28, having a bevel-gear 32 at the inner end thereof adapted to mesh with either one of the train bevel-gears 33 and 33, carried by the longitudinal shaft 28 about midway of its length, or to be out of gear with both, depending upon whether the said longitudinal shaft 28 is moved forward or backward or held in inoperative central position by means of the column or drum-controlling lever 34 and its connecting-rod 35 and arm 36 to the said shaft.

The transverse operating-shaft 31 extends laterally beyond the bed of the vehicle and has its outer end adapted to receive a crank 37, by means of which the rotary columns or roll-drums 4 and 4 may be operated by hand, if desired, when the vehicle is at rest. When the vehicle is in motion, however, I provide for automatically turning this shaft 31 from the rotary rear axle of the vehicle. This latter, as shown, is provided with a sprocket-wheel 38, fixed thereto at a convenient point in its length, the fixed bearing-sleeve 9 for the axle being divided at its central portion and formed with a yoke connection 39, which allows of free rotation of the sprocket-wheel, and this sprocket-wheel is operatively connected by a driving-chain 40 to a sprocket-wheel 41, loosely mounted on the shaft 31, but adapted to rotate the latter with it when the clutch-hub 42, feathered to said shaft, is moved laterally into engagement therewith by means of the lever 43 and the intermediate connecting-rod 44 and bell-crank 45.

So far as has been thus far described no provision has been mentioned for making the vehicle self-propelling, and the rotary columns have been described as operated either by hand, as when the vehicle is at rest, or automatically from the rear axle when the vehicle is in motion. In a very simple manner, however, I provide for utilizing the mechanism already fully described in connection with a suitable motor mounted on the vehicle, so as to propel the latter thereby or directly operate the roll-columns. Any suitable kind of motor, located as indicated at 46, may be employed, it being arranged to drive a motor-shaft 47. As shown, the motor-shaft is in turn arranged to drive the transverse operating-shaft 31 through a counter-shaft 48, adapted to considerably reduce the number of revolutions of the operating-shaft relative to the speed of the motor, sprocket wheels and chains 49 and 50, respectively, being preferably employed to transmit motion to and from the counter-shaft 48. The chain 50 drives a sprocket-wheel 51, loosely mounted on the operating-shaft 31, which latter is thus rotated with the motor-shaft only through the medium of a clutch mechanism comprising, as shown, a hub 52, feathered on the operating-shaft and movable into engagement with the loose wheel 51 by means of a lever 56 through the connecting-rod 53 and bell-crank 54.

The main purpose of my invention, it will be understood, is to exhibit upon an extended strip of suitable fabric 55, the opposite ends of which are secured, respectively, to the front and rear rotary columns, a series of suitable advertisements or exhibits painted or secured thereon, the fabric being wound in a roll from one column onto the other, and then, by reversing the rotation of the roll-columns, back again to the first, this being done with equal ease and satisfaction whether the bed upon which the vertical roll-columns are rotatably mounted is fixed or movable and in the latter case whether it be pulled, as by horses, or propelled by a motor forming part of the complete structure, as above particularly described. In the latter case my entire mechanism is utilized as follows: When the motor is in operation, the counter-shaft 48 and loose sprocket-wheel 51 on the operating-shaft 31 are continuously rotated. If it be desired merely to operate by power the advertising-panorama without moving the vehicle upon which it is mounted, instead of requiring the operator to do this by means of the crank 37 the lever 56 is moved to throw the clutch-hub 52 into engagement with the normally loose sprocket-wheel 51, thus rotating the shaft 31. The axle driving (or driven) sprocket 41 is left loose on the shaft, so as to have no effect upon the rear axle, and the central longitudinal shaft 28 is moved forward or backward, as the case may be, to throw it into engagement with the bevel-wheel 32 of the operating-shaft 31 and also with one or other of the column-shafts 21 or 21 to rotate the latter, and so roll up upon the column the advertising fabric 55, the disengaged column-shaft being left free to rotate as required to furnish the fabric to the rotated column. In case it be desired to propel the vehicle simultaneously with this operation of the panorama the lever 43 is simply moved to engage the second sprocket-wheel 41 on the shaft 31, thus causing its rotary motion to be transmitted through the chain 40 to the rear driving-axle 8, as well as to the roll-column. Obviously if the vehicle is moved independently of the motor the sprocket-wheel 51 will be disengaged from the shaft 31, which will then be rotated by the rear axle 8 through the chain 40, (instead of itself driving said axle, as previously described,) and the panorama will be automatically operated in one direction or the other or left at rest, depending upon the position to which the central longitudinal shaft 28 is moved by the lever 34, the middle position of the latter leaving it entirely out of engagement with the shaft 31. Thus, it will be understood, the operation of both the panorama mechanism and the propulsion of the vehicle are under absolute and easy control, each being readily operated independently or jointly in the particular manner desired under different conditions.

In order to provide proper protection from the weather under different circumstances, to the panorama itself, to the platform forming part of the apparatus, and to interested inquirers who may desire to make close inspection or inquiries, I have devised a roof-awning arrangement specially suited to the peculiar construction and uses of my improved apparatus, which I will now describe.

As already stated, the column-shafts 21 and 21 are extended some distance above the roll-columns 4 and 4, the purpose being to make them serve as supports for the roof and awning. The framework for the roof comprises a central longitudinal bar 60, preferably extending the full length of the vehicle, with inclined rafters 61 secured to said bar 60, the whole supported upon collars 62 63 on the two column-shafts 21, as shown. The shafts 21 are free to rotate while also serving as supports for the roof, and the latter, in addition to its main function of in turn supporting the roof covering or canvas 54, also serves as a distance-brace between the columns to prevent bending or leaning of the same toward each other, due to the weight and pull of the rolled advertising fabric, thus relieving to a considerable extent the upper roll-bearings 26 at the bases of the columns. The eaves of the roof are preferably formed by longitudinal bars 65 65, connected to the rafters at the opposite ends of the latter, and extension-bars 66 66, &c., from the rafters are shown at either side as reaching down and secured to the floor of the vehicle, so that the canvas roof-covering, having its side edges suitably weighted and supported by longitudinal strips or bars 67, may be supported thereon when it is lowered to form a side closure, as indicated to the left of Fig. 3, to afford the most complete protection from the weather which this character of covering can provide. When, however, it is merely desired to provide an overhanging awning adapted to protect people standing at the side of the vehicle for the purpose of closely inspecting the advertisements or samples, I employ one or more bracing-arms 68 to support in elevated position the barred lower edge 67 of the canvas, as indicated to the right of Fig. 3. These bracing-arms 68 are pivoted to the floor at one end, so as to be capable of being laid flat thereon or raised, as indicated, to support the canvas.

It will be readily seen I am able to provide a very large advertising-surface, readily amounting to eight or ten thousand square feet, owing to the fact that both sides of the canvas can be utilized for this purpose, so as to be seen at the same time from either side of the wagon, as well as at both ends. This permits of making a relatively small charge per foot of advertising-surface, which is a great advantage. It will be understood also that my apparatus may be adapted for use independently of any vehicle mechanism for stationary use, as in show-windows. While any desired form of motor may be employed, I prefer ordinarily to use steam as most satisfactory for general use. I do not wish, however, to unduly limit myself to the preferred construction specifically described, which may be readily modified in many respects if desired.

What I claim is—

1. The combination with the bed, of the front and rear vertical roll-columns, centrally located transversely, the bearings on the bed for said columns, shaft extensions of the columns below said bearings, the horizontal shaft under said bed between said shaft extensions, the transverse operating-shaft arranged to engage said horizontal shaft to rotate the latter in one direction or the other, and mechanism for throwing said horizontal shaft into rotating engagement with one or other of said shaft extensions, substantially as set forth.

2. The combination with the bed and the vehicle running-gear comprising a rotary rear axle, of the front and rear vertical roll-columns located centrally thereon transversely, the bearings on the bed for said columns, shaft extensions of the columns below said bearings, the horizontal shaft under said bed between said shaft extensions, the transverse operating-shaft arranged to engage said horizontal shaft to rotate the latter in one direction or the other, mechanism for throwing said horizontal shaft into rotating engagement with one or other of the columns, and operating mechanism for said transverse shaft connecting with said rotary axle, substantially as set forth.

3. The combination with the bed and the column bearing-ring fixed thereto, of the roll-column having a central shaft extending below the base-plate thereof, a bearing-disk fixed to said shaft extension below said base-plate, a ball-race formed in the meeting faces of said fixed bearing-ring and rotary bearing-disk, and guide-rollers mounted in brackets fixed to the bed and overhanging said bearing-disk, substantially as set forth.

4. The combination with the bed and the column bearing-ring fixed thereto, of the roll-column having a central shaft extending below the base thereof, and above the roll-columns, operating mechanism for said roll-columns located beneath the bed and arranged to engage said shaft extensions, and a roof-frame mounted upon said upward extensions of the column-shafts and serving to maintain a uniform spread of the columns and thereby relieve the bottom bearings of the latter substantially as set forth.

5. The combination with the bed and the two vertical roll-columns rotatably mounted thereon and having central shafts with upward extensions above the columns, of a roof-framing comprising inclined rafters loosely mounted upon said shaft extensions, and horizontal purlin-bars connecting said loosely-mounted rafters to form a rigid roof-frame between the column-shafts supporting the same, substantially as set forth.

6. The combination with the bed and the two vertical roll-columns rotatably mounted thereon and having central shafts with upward extensions above the columns, of a roof-framing mounted upon said shaft extensions, a canvas roof-covering depending on either side below the eaves of the roof-framing toward the bed to form side walls, and a brace or braces pivoted at one end to the bed and adapted when raised to engage and support the free lower edges of the canvas covering in elevated and laterally-projected position, substantially as set forth.

Signed at Reading, Pennsylvania, this 11th day of June, 1901.

JOSEPH LEIGHTHAM.

Witnesses:
D. M. STEWART,
W. G. STEWART.